July 26, 1932. E. H. MILES ET AL Re. 18,542
COMPOSITION OF VEGETABLE FOOD AND PROCESS OF MAKING THE SAME
Original Filed July 8, 1926
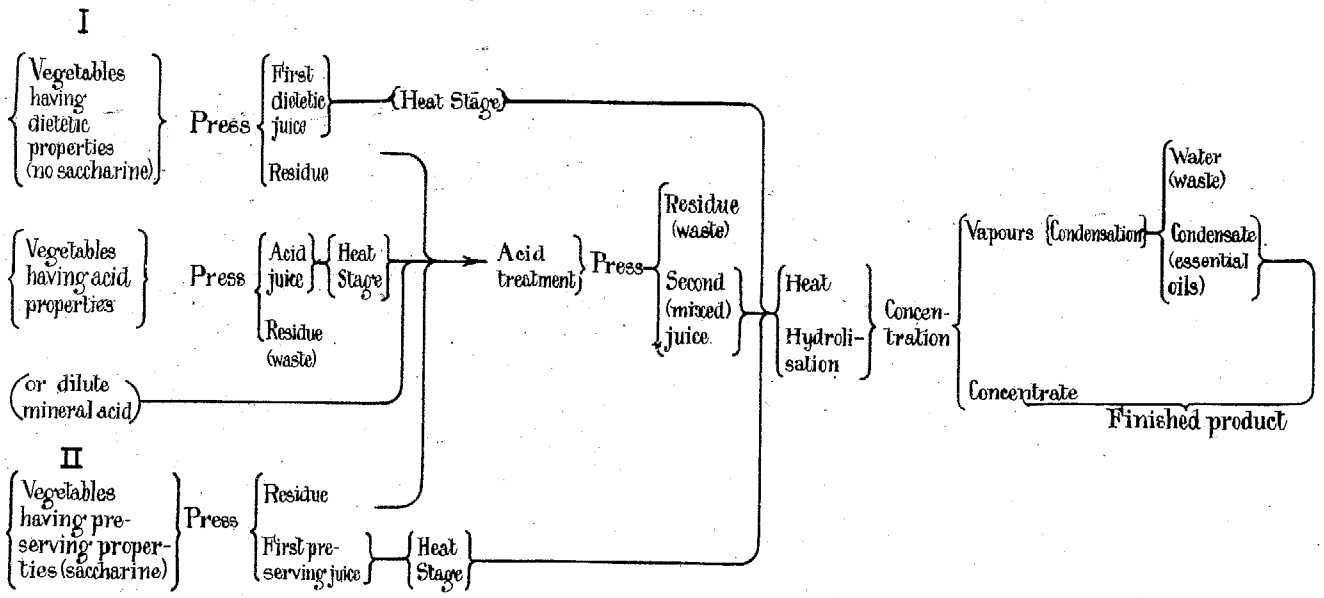
Inventors
EUSTACE HAMILTON MILES,
GERARD REILLY,
BY Toulmin & Toulmin,
Attorneys Reissued July 26, 1932 Re. 18,542

UNITED STATES PATENT OFFICE

EUSTACE HAMILTON MILES, OF LONDON, AND GERARD REILLY, OF LUTON, ENGLAND

COMPOSITION OF VEGETABLE FOOD AND PROCESS OF MAKING THE SAME

Original No. 1,775,966, dated September 16, 1930, Serial No. 121,229, filed July 8, 1926, and in Great Britain July 15, 1925. Application for reissue filed January 11, 1932. Serial No. 585,981.

This invention relates to a new concentrated vegetable food composition and the process of making the same.

One of the objects of our invention is to produce a highly concentrated vegetable food composition made from selected classes of vegetables; this composition is of a pleasant flavour, free from bitterness or other unpleasant taste, and it contains undeteriorated the greater part of the vitamins, natural plant salts, (metallic salts in organic combination), essential oils and other food elements of the vegetables (much of which is lost in ordinary cooking), so combined as to be easy of digestion, and so as to form a curative food suitable for the maintenance of health and prevention of disease, and which also will remain good and edible for many months even though exposed to the air, without the addition of any preservative whatever, and without subjection to great heat as in cooking or canning, and which can be packed and transported without risk of deterioration.

Hitherto in order to delay or prevent decay or deterioration of food products, it has been found necessary to subject them to a high temperature as in ordinary cooking or to prolonged heating as boiling or baking, and/or also to add thereto some preservative, such as ordinary refined (and therefore devitalized) sugar, table salt, boric acid or formaldehyde. Such sugar sometimes crystallizes when the food is exposed to the air and also is irritating to the stomach and is difficult of digestion by certain persons. Salt is well known to the medical profession to have a deleterious effect on the blood pressure of certain persons. Boric acid is also well known to be deleterious to health, as is formaldehyde.

High temperatures, such as are used in ordinary cooking, destroy or render less capable of assimilation some of the vitamins, natural plant salts, essential oils and other valuable food elements. These are retained undeteriorated by our process in which the temperatures employed and the duration of their employment are considerably less than those used in ordinary cooking of vegetables. This results also in great economy of fuel and heat.

Moreover, in the process, object of this invention, the use of added preservatives is entirely avoided and the product is preserved from decay or deterioration by the use of the juice of vegetables containing saccharine material, besides other constituents of dietetic and curative value. Also, the juices obtained in the course of the process are treated so as to hydrolyze the saccharoses, so that crystallization is avoided, while at the same time the vitamins and other valuable food elements in the juices (which are absent from refined sugar) are retained, and so the food value of the product is increased. The high concentration of the natural salts, vitamins, and the oils of the vegetables themselves, if any, also act as a preservative.

We produce this composition by a new process (hereafter more particularly described) which consists in selecting vegetables according to their nature and in suitable proportions (as directed by the dietist), some vegetables (Class I) being chosen for their dietetic value, others (Class II, containing at least 1% of saccharine material) for their preservative properties, while others (Class III), of an acid nature, are used for the extraction of the insoluble natural plant salts contained in the former material. Instead of using vegetable material for this purpose, however, dilute mineral acids may be used if a product of inferior quality only is sought.

In order to carry out the process, according to this invention, after the vegetables have been cleaned, they are comminuted and the vegetable pulps of Class I and Class II are drained and pressed, to obtain a first dietetic and a first preservative raw juice; the vegetables of Class III are similarly treated to obtain a first acid raw juice, with which some or all of the residues (or residual matter of vegetable fibre, cell substance, press-cakes, etc.) obtained from the materials of the two first classes are treated for the purpose of rendering soluble the insoluble natural plant salts which these residues contain, (for instance, calcium and magnesium phosphates, etc.); and extracting them, together with any other valuable dietetic and curative material which may have remained in the fibres, etc. the residues so treated are drained and pressed separately or together to obtain a second dietetic and preservative juice or acid extract, which is mixed with the first juices. The residues may be further treated with another solvent, such as water, and again drained and pressed to ensure a more thorough extraction of the valuable constituents, and when a third juice is so obtained, it is added to the others. The mixed juices are warmed to a relatively low temperature till the hydrolyzation of the sucroses is well advanced, and then concentrated in vacuo. During evaporation, the hydrolyzation continues; additional flavours develop in the substance, by the interaction of the various compounds present and the effects of the heating and dehydration; also certain volatile constituents (e. g. essential oils) are vaporized and appear in the condensate; such of these as are beneficial may be separated from the condensate and returned to the concentrate to form the finished product, and contribute to the flavour, the curative effects, and the keeping qualities of the whole. Some part of the vegetable material may be included in the final product, in a whole or divided state.

As generally carried out, another heat step is introduced in the process, at some stage thereof, before the various juices are mixed together for the hydrolyzation step leading to the formation of the final product. The position of this heat step in the sequence of operations varies with the nature of the vegetable material. Any coagulum formed during this heating may be strained off, using pressure if necessary, and discarded, and when this coagulum is too bulky to allow the juice to be easily separated from it, it may be gently evaporated dry to reduce the bulk of the coagulum, and the soluble portion extracted by lixiviation with water or other solvent.

The appended table shows in a diagrammatical manner how the process is carried out, with the exception that the heat step mentioned above does not necessarily always take place at the same stage of the process. In the diagram it is shown as taking place after the respective first juices have been obtained. In certain cases the heat step may be altogether omitted.

It may be noted here that hydrolyzation, in our process, differs from that ordinarily employed by chemists, namely, by heating a substance with a crude acid or alkali, which is not suitable for a food product. In fact, an important new feature of our process is that such hydrolyzation is performed, not by mineral acids, but by natural (non-devitalized) plant salts and acids at a temperature which does not devitalize either them or the product. The hydrolyzation is done by the effect of moderate heat and of the acid of the vegetables used for the extraction of the insoluble phosphates, and of other salts, and also by those salts themselves and by the natural salts of the other juices, which constituents all coact in the process.

Another feature of our process which is new and essential to the obtainment of a product of superior quality is that the insoluble phosphates in the vegetables are rendered soluble by the use of the fresh non-devitalized juices of acid vegetables or fruit (acid juice III) in the treatment of said residues, instead of mineral acid.

A further feature which is new and essential to the obtainment of a product of superior quality is that we employ the fresh non-devitalized juices of acid vegetables or fruit (acid juice III), as they exist in the plant, instead of using inorganic acid, to extract the natural salts, and especially the phosphates of the calcium and magnesium, from the said residues.

This extraction is thus effected without destroying the vitalistic connection between the mineral part and the organic part of said natural plant salts, in other words, it avoids devitalization of said salts. The use of mineral acids to effect the extraction of said salts would have the effect of devitalizing them. Also, the phosphates are thus removed from the fibre, etc., of the residues in such form as to be directly assimilable by the human system, in which they are of great value as food for the brain and nerves and bones. The use of mineral acid destroys or reduces this assimilability.

The result of our process is a new and improved food product more beneficial to health, which contains in a greater quantity and in a more concentrated form than in other known food products the natural plant salts (metallic salts in organic combination) and vitamins of the vegetables themselves; and a special characteristic of this food is that it keeps edible for many months though exposed to the air.

Our product is useful and also of improved efficacy as a remedy in and a preventive of those states of ill-health which are due to deficiency of the natural plant salts and vitamins, and it can be prepared to contain special proportions of those natural plant salts which have good effects in cases of disease by selecting for the process vegetables containing them, for example (but not limiting it to use in such diseases) salts of sodium for acidosis in general; of potassium, for cancer; of iron, for anæmia, of calcium for defective digestion of albumen, for too free bleeding, for deficiencies of teeth and bone, and of tone to the bowels. It is an aid in constipation. Magnesium also aids in cases of constipation and deficient bowel tone.

For this purpose, vegetables may be selected for use in our process which contain a high proportion of such salts either normally or by reason of being grown on soils which produce in them an excess of such salts. The selection of such vegetables and the quantity of them to be used in the process may be left to the choice of the dietist or chemist desiring to prepare such special food by our process for use in the case of those suffering from one or other of such diseases. An example of this preparation is given hereafter.

Our product is characterized by a distinctive pleasant flavour partaking partly of the combined flavour of the different vegetables used, also by the absence of all bitterness or unpleasant flavours which may exist in the vegetables themselves, or may be developed by comminuting the vegetables or otherwise during the process; which unpleasant flavours are eliminated by the modifications of the different steps of our process or of their sequence, as set forth. The characteristic flavour of our product is also created partly by the caramelization which takes place during the evaporations, and an agreeable colour is also thereby created which is useful in making a salable product.

When carrying out this process, it is found that different kinds of vegetables require different treatment in order to free them, at the stage when this can be done in the most simple and efficient manner, of objectionable flavours which they are apt to develop at certain stages of the process. For example, certain vegetables, if comminuted cold, develop undesirable properties (e. g. onions turn bitter). In this case the heat step is applied before comminution. The vegetables may, however, be sliced, if too large to be readily heated rapidly.

Also, in order to obtain a material of fine flavour and high dietetic and curative value, certain slight modifications of the process are introduced, according to the nature of the vegetables treated.

Also, in certain cases, some of the juices may be discarded or some of the residues may be added to the juice, after grinding if necessary. For example, for certain ailments, high proportions of calcium and/or magnesium are required. In producing the food for such purpose, juice extracted from the residue from the first pressing of vegetables of the first two classes by the acid treatment, as above described, may form the bulk of the vegetable juices used (the juices obtained from the first pressings of these not being used, in this special case).

When a vegetable contains an essential oil of undesirable properties (e. g. nauseous flavour) the juice obtained from it as described above may be evaporated separately; the condensate, containing the essential oil, is discarded, while the concentrate is mixed with the other concentrate, or the other juices are added to it prior to the final concentration.

The first acid juice may, if desired, be diluted with water to reduce its acidity or increase its volume.

When dry vegetable matter is to be used (e. g. seeds, beans), water or another solvent may be used to soften it and permit the extraction of the soluble matter therefrom.

When vegetable matter containing fixed oil is used, appropriate means may be used to effect the intimate mixture of the oleaginous juice with the other juices, for instance, the oil may be emulsified in order to mix it with the other materials.

For these reasons, in describing hereafter the particular applications of the process to these different kinds of vegetables, the vegetables of Class I are divided into four sub-classes needing different treatment on account of the different properties of the vegetables they contain.

*Sub-class* (*a*)—Vegetables from the raw juice of which undesirable properties, such as bitter or nauseous flavours, characteristic of the vegetable itself, can be removed by heating the juices and straining. (Type spinach, lettuce, cabbage, etc.)

*Sub-class* (*b*)—Vegetables the raw juice of which does not contain such undesirable properties and therefore require no such heating. (Type celery.)

*Sub-class* (*c*)—Vegetables which develop undesirable properties such as bitter flavours when the cell structure is ruptured by comminuation. (Type onions.)

*Sub-class* (*d*)—Dry, or partly dry material, such as seed vegetables. (Type beans.)

Some materials, for instance, water-cress, may be classified sometimes in one class and sometimes in another, according to the flavour it is desired to develop, and treated accordingly.

As shown in the following examples, the manufacture of the food composition or product is not limited to the vegetables of one only of the sub-classes of Class I; a food composition according to this invention may be made with vegetables belonging to two or more sub-classes, as shown in Example V. It is moreover to be understood that these examples are for the purpose of illustration only, and that the invention is not limited thereto.

*Example I. Vegetables* (*a*).—Preparation of lettuce and cabbage. After being thoroughly cleaned and all decayed portions and refuse removed, five pounds of lettuce and twenty of cabbage are divided and comminuted and the resulting pulp drained and pressed to obtain as much as possible of the vegetable raw juice, and the residue of fibre and cell material is reserved. The juice is then heated to 80° C. and on cooling the coagulum which has formed is strained off and subjected to pressure. The clear juice (first dietetic juice) is also reserved, the coagulum being discarded.

Ten pounds of carrots and ten pounds each of beets and parsnips are treated in a similar manner and the clear juice (first preserving juice) is also reserved, and also the residue of fibre and cell material.

Ten pounds of tomatoes are treated in a similar manner and the clear acid liquor so obtained (first acid juice) is reserved, the residue being rejected. The liquor is diluted with water till the acidity is reduced to 0.35%; this diluted liquor is reserved for the acid treatment of the residues.

The residues reserved are broken up small, mixed and treated with the acid liquor by sprinkling or spraying, the material being stirred and kneaded to ensure mixture and thorough penetration by the liquid, the action being continued for an hour. The material is then pressed in order to extract the liquid or second juice. The residue from this second pressing is treated with water in a similar manner, and further valuable material (third juice) is obtain by pressing. The two first juices and the second and third juices are then mixed together in one vessel and heated to 80° C., till hydrolyzation of the saccharoses is well advanced. The resulting liquor is then cooled to about 30° C., and introduced in a vacuum evaporator and concentrated to the final product.

*Example II. Vegetables* (*b*).—Preparation of celery. After being thoroughly cleaned and all decayed portions and refuse removed, thirty pounds of celery are comminuted, drained and pressed, and the resulting juice (first dietetic juice) reserved without further treatment the residue of fibre, etc., being also reserved. A first preservative juice is also obtained from carrots, beets and parsnips, as in Example I, and reserved. The two residues are mixed and treated as in Example I, a second and third (mixed) juice being obtained in this manner. These are mixed with the two first juices already obtained and further treated as in Example I. The flavoured essential oils of the celery are separated from the condensate and re-mixed with the concentrated product.

*Example III. Vegetables* (*c*).—Preparation of onions and water-cress. After being thoroughly cleaned and all decayed portions and refuse removed, fifteen pounds of onions and five pounds of water cress are sliced or divided so that the thickest parts are not more than ¾ in. thick, and are heated with steam or by plunging them in hot water, the material being heated to between 75° and 80° C., but not subjected to a long cooking. The material is then comminuted and the pulp drained and pressed as before. The juice and residue are reserved and the rest of the process is carried out as in Example I.

*Example IV. Vegetables* (*d*).—Preparation of haricot or Lima beans. After being thoroughly cleaned and all decayed portions and refuse removed, twenty pounds of haricot or Lima beans and two pounds of bran are covered with fresh water, and allowed to swell and soak. After several hours (the time must obviously vary with the condition of the materials and the temperature, but should be as short as possible), the liquid is drained off, the larger material is comminuted and pressed and the liquid is added to the juice so obtained. The resulting first raw juice is heated and evaporated to dryness in shallow pans over the water-bath, that is to say, without being subjected to any high temperature, and the dried residue is heated, still on the water-bath, till it develops a faint orange-red colour, and at the same time an appetizing flavour, by the slight dehydration or caramelization of the constitutents of the substance. This dried and treated material is then lixiviated with water in small quantities to dissolve out the soluble constituents, and the resulting pasty material is drained and pressed; the liquor obtained constitutes the first dietetic juice. The first residue obtained in the course of this process is reserved for acid treatment. The rest of the treatment is carried out as in Example I.

*Example V.*—Of vegetables of Class I, sub-class (*a*), 5 pounds lettuce, one pound cabbage, five pounds watercress, after being thoroughly cleaned and all decayed portions removed, are divided and comminuted and the resulting pulp drained and pressed to obtain as much as possible of the vegetable raw juice and the residue of fibre etc. is reserved. The juice is then heated to 80° C. and, on cooling, the coagulum which has formed is strained off and the coagulum subjected to pressure. The clear juice (first dietetic juice) is reserved, and also the residue of fibre and cell material etc. as in Example I.

Of vegetables of Class I, sub-class (*b*), thirty pounds of celery, after being thoroughly cleaned and all decayed portions removed, are comminuted, drained and pressed, and the resulting juice (first dietetic juice) reserved without further treatment, as also the residue of fibre, etc.

Of vegetables of Class I, sub-class (*c*), fifteen pounds of onions, after being thoroughly cleaned and all decayed portions removed, are sliced or divided so that the thickest parts are not more than ¾ in. thick, and are heated with steam or by plunging them in hot water, the material being heated to between 75° C. and 80° C., but not subjected to a long cooking. The material is then comminuted and the pulp drained and pressed as before. The juice and residue are reserved.

Of vegetables of Class I, sub-class (*d*), two pounds of beans and two pounds of bran, after being thoroughly cleaned and all decayed portions removed, are covered with fresh water, and allowed to swell and soak. After several hours (the time must obviously vary with the condition of the materials and the temperature, but should be as short as possible), the liquid is drained off, the larger material is comminuted and pressed and the liquid is added to the juice so obtained. The resulting first raw juice is heated and evaporated to dryness in shallow pans over the water-bath, that is to say, without being subjected to any high temperature, and the dried residue is heated, still on the water-bath, till it develops a faint orange-red colour, and at the same time an appetizing flavour, by the slight dehydration or caramelization of the constituents of the substance. This dried and treated material is then lixiviated with water in small quantities to dissolve out the soluble constituents, and the resulting pasty material is drained and pressed; the liquor obtained constitutes the first dietetic juice. The first residue obtained in the course of this process is reserved for acid treatment.

Of vegetables of Class II, twenty-five pounds of carrots and five pounds of beet root, after being thoroughly cleaned and all decayed portions removed, are divided and comminuted and the resulting pulp drained and pressed to obtain as much as possible of the vegetable raw juice, and the residue of fibre, etc. is reserved. The juice is then heated to 80° C. and, on cooling, the coagulum which has formed is strained off and the coagulum subjected to pressure. The clear juice (first preservative juice) is reserved, and also the residue referred to above.

All these reserved first juices are mixed together and all these reserved residues are also mixed together.

Of vegetables of Class III, ten pounds of tomatoes, after being thoroughly cleaned and all decayed portions removed, are divided and comminuted and the resulting pulp, separated from skins and seeds, which are discarded, is then drained and pressed to obtain as much as possible of the vegetable raw juice, and the press cake or residue of the fruit pulp is reserved. The juice is then heated to 80° C. and, on cooling, the coagulum which has formed is strained off and the coagulum subjected to pressure. The clear acid liquor so obtained (first acid juice) is reserved, the residue being rejected. The liquor is diluted with water till the acidity is reduced to 0.35%; this diluted liquor is reserved for the acid treatment of the residues.

The residues are broken up small, mixed and treated with the acid liquid by sprinkling or spraying, the material being stirred and kneaded to ensure mixture and thorough penetration of the liquid, the action being continued for an hour. The material is then pressed in order to extract the liquid or second juice. This second residue is treated with water in a similar manner, and further valuable material (third juice) is obtained by pressing. The two first juices and the second and third juices are then mixed together in one vessel and heated to 80° C., till hydrolyzation of the saccharoses is well advanced. The resulting liquor is then cooled to about 30° C. the reserved pulp of the tomatoes is added, and the whole is introduced in a vacuum evaporator and concentrated to the final product.

If it is desired to have a product containing more or less potash, soda, lime, magnesium, iron, or other salts suitable for persons suffering from certain ailments such as acidosis, rheumatism, gout, anæmia, etc., vegetables which contain more or less of said salts can be selected for the treatment under our process.

All the vegetables are to be taken in their raw state, thoroughly cleaned and all refuse and decay removed. All the materals of the vessels, etc., which come into contact with the product in any stage of the process, must be such that no deleterious action takes place.

The residues obtained from materials of Class I will have different values as sources of calcium and magnesium, partly on account of the kind of soil the vegetables are grown upon. The residues containing the most calcium and/or magnesium salts are selected for treatment by the acid liquor either by chemical test, or roughly by inspection of the ash. The residues selected are collected together and broken up fine so that they can be readily penetrated by the said acid liquid. This acid liquid is sprayed over the said residues, and the whole is stirred and kneaded to secure mixture and the action is allowed to go on for an hour at a temperature not exceeding 75° C., when the mass is drained and pressed again to separate the liquid from the residue. The residue is then treated by adding water, stirring, as before, and draining and pressing will secure further valuable juice. The final residue is waste. Selected portions of the other residues, which have not been treated by acid, may, if desired, be ground fine and added to the concentrated product to use the natural salts still remaining therein.

The final composition or product is a semi-solid mass of the consistency of dough or thick paste. It is plastic, not elastic like jelly. The specific gravity is about 1.5. The odour is aromatic and appetizing. The colour is a deep brown, slightly reddish. The taste is compounded partly of the characteristic flavours of the vegetables used, with an additional flavour caused by the slight caramelization of those constituents which are sensitive to the low temperature employed. It is piquant with the slight acidity of the acid juice. When diluted with water it forms an appetizing soup. The water content is about 30%. The ash content is about 10% notwithstanding that no inorganic mineral salts (such as table salt) are added. The organic part consists largely of sugars, and other carbohydrates, and also proteids and extractives.

In our present application for patent we desire to claim our new food and the process of making it broadly and generically; in an application of even date herewith we claim one specific form of our invention.

What we claim and desire to secure by Letters Patent is:—

1. A process, throughout which the heat employed is not prolonged more than about 1 hour at the temperature specified and does not exceed about 80° C., for the manufacture of an alimentary preparation of vegetable material (I) having dietetic properties and a vegetable material (II) having also preservative properties, and vegetable material (III) having acid properties, comprising the following steps in any order: extracting from (I) a first dietetic juice, leaving a residue, extracting from (II) a first preservative juice, leaving a residue, extracting from vegetable material (III) a first acid juice, treating a residue aforementioned with the acid juice to obtain a second juice, heating a juice till hydrolyzation of the sucroses is well advanced, uniting the juices and concentrating the resulting product.

2. A process for the manufacture of an alimentary preparation of vegetable material (I) having dietetic properties and of vegetable material (II) having preservative properties as well as containing valuable dietetic and curative constituents, consisting in submitting the materials (I) and (II) to a preliminary cleaning, soaking, trimming and dividing treatment, draining and pressing (I) to get a first dietetic juice and a residue, draining to pressing (II) to get a raw preserving juice and a residue, heating the said raw preserving juice, pressing the resulting product to obtain a first preserving juice and a residue, reserving and mixing the residues, which still contain valuable residual materials of dietetic, curative and preserving value, treating the aforesaid reserved residues with a diluted acid solvent of the aforesaid valuable residual materials, draining and pressing to get a second (mixed) juice, mixing the first dietetic and preservative juices with the second juice, heating the final juice mixture till hydrolyzation of the sucroses is well advanced, and concentrating the resulting product.

3. A process for the manufacture of an alimentary preparation as claimed in claim 2, in which a heat step is introduced in the treatment of the materials (I), such a step being introduced after the pressing, for the purpose of producing a coagulum in the raw juice obtained, and the product resulting therefrom being further drained and pressed to obtain the first dietetic juice.

4. A self-preserving alimentary preparation of vegetable material comprising in combination a natural non-devitalized extract of vegetable materials having dietetic and curative properties, and a natural non-devitalized extract of vegetable materials having preservative in addition to dietetic and curative properties, and an extract, made by means of the extracted juices of acid vegetable material, of the selected vegetable residues from which the two first named (simple) extracts were made, the said extract containing, undeteriorated, the vitamins, natural plant salts, essential oils, and other dietetic, curative and preservative natural constituents of the said vegetable materials which remains good and edible even though exposed to the air.

5. The new vegetable food product comprising a mixture of strictly vegetable food ingredients only, one ingredient being a natural non-devitalized extract of vegetable materials having dietetic and curative properties, and another ingredient being a natural non-devitalized extract of vegetable material having preservative properties and a third ingredient being an extract from the residues of the vegetable treated to obtain the first two ingredients obtained by treating the said residues with the extracted juices of acid vegetable materials, the mixture having the following characteristics and properties, it keeps, remaining good and edible even though exposed to the air and contains substantially undeteriorated, the vitamins, natural plant salts and other dietetic, curative and preservative natural constituents of the vegetables extracted, and contains a larger proportion of natural salts than the products made without the acid extract of the vegetable residues.

In testimony whereof, we affix our signatures.

EUSTACE HAMILTON MILES.
GERARD REILLY.